United States Patent
Wang et al.

(10) Patent No.: US 9,849,595 B2
(45) Date of Patent: Dec. 26, 2017

(54) CONTACT FORCE LIMITING WITH HAPTIC FEEDBACK FOR A TELE-OPERATED ROBOT

(71) Applicant: ABB Schweiz AG, Baden (CH)

(72) Inventors: Jianjun Wang, West Hartford, CT (US); Thomas A. Fuhlbrigge, Ellington, CT (US); Biao Zhang, West Hartford, CT (US)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 15/016,578

(22) Filed: Feb. 5, 2016

(65) Prior Publication Data

US 2016/0229050 A1    Aug. 11, 2016

Related U.S. Application Data

(60) Provisional application No. 62/112,688, filed on Feb. 6, 2015.

(51) Int. Cl.
  *B25J 9/16* (2006.01)
  *B25J 13/02* (2006.01)
  *G06F 3/01* (2006.01)

(52) U.S. Cl.
  CPC .......... *B25J 13/025* (2013.01); *B25J 9/1689* (2013.01); *G06F 3/016* (2013.01);
  (Continued)

(58) Field of Classification Search
  CPC ............... G06F 3/016; G06F 2203/015; G06F 2203/014; A61B 34/76; B25J 9/1689;
  (Continued)

(56) References Cited

U.S. PATENT DOCUMENTS 7,340,323 B2    3/2008  Zhang et al.
8,174,535 B2*   5/2012  Berger .................... G06T 19/00
                                                345/419

(Continued)

FOREIGN PATENT DOCUMENTS

DE          3439495 A1    5/1985

OTHER PUBLICATIONS

Wyatt S. Newman, "Stability and Performance Limits of Interaction Controllers", ASME Journal of Dynamic Systems and Control, 1992.

*Primary Examiner* — Jason Holloway
(74) *Attorney, Agent, or Firm* — Taft Stettinius & Hollister LLP

(57) ABSTRACT

One exemplary embodiment is a system comprising an operator input device structured to move in response to operator-applied force and to selectably output feedback force to the operator. A first computing system is structured to receive input from the operator input device and provide an output. A second computing system is structured to receive the output and provide a robot control command subject to a force constraint. An industrial robot system is in operative communication with the second computing system and comprises a robotic arm structured to move in response to the command. The second computing system is structured process the output to impose a force constraint using a dual threshold hysteresis control. The first computing system is structured to apply a feedback force to the operator input device correlated to force associated with the industrial robot system.

20 Claims, 4 Drawing Sheets

(52) U.S. Cl.
CPC ........... *G05B 2219/36455* (2013.01); *G05B 2219/37396* (2013.01); *G06F 2203/014* (2013.01); *G06F 2203/015* (2013.01); *Y10S 901/04* (2013.01)

(58) Field of Classification Search
CPC ......... B25J 13/025; G05B 2219/37396; G05B 2219/36455; Y10S 901/04
See application file for complete search history.

(56) References Cited

U.S. PATENT DOCUMENTS

| | | | |
|---|---|---|---|
| 8,992,542 B2 * | 3/2015 | Hagag | A61B 17/162 606/130 |
| 9,104,271 B1 * | 8/2015 | Adams | G06F 3/0426 |
| 2006/0030840 A1 | 2/2006 | Nowlin et al. | |
| 2008/0103639 A1 | 5/2008 | Troy et al. | |
| 2009/0248037 A1 | 10/2009 | Prisco | |
| 2010/0041991 A1 | 2/2010 | Roundhill | |
| 2015/0164600 A1 * | 6/2015 | Hagag | A61B 17/162 606/79 |
| 2015/0298318 A1 | 10/2015 | Wang et al. | |
| 2017/0112580 A1 * | 4/2017 | Griffiths | A61B 34/35 |

* cited by examiner

CONTACT FORCE LIMITING WITH HAPTIC FEEDBACK FOR A TELE-OPERATED ROBOT

BACKGROUND

The present application relates to the tele-operation of industrial robots. Tele-operation of industrial robots occurs when an operator is located apart from a robot when the robot performs work. An industrial robot is typically an automatically controlled, programmable, multipurpose manipulator programmable in three or more axes. Examples of industrial robots are robots located at a fixed position and robots that are mobile by themselves or mobile because the robot is mounted on a device that it is itself mobile such as a motorized vehicle or mounted on a track or gantry etc. By located apart from each other is meant that the operator and tele-operated industrial robot are either within the line of sight of each other or are separated from each other by a barrier through which the operator can see the robot that is controlled by the operator, or are at a distance from each other such that the operator cannot see the robot with his or her eyes. A tele-operated robot system may include a see through barrier to separate the operator from work performed by the robot that is hazardous to the health or safety of the operator. Applications for tele-operated industrial robots include machining, handling of hazardous materials, assembling/disassembling, operation in a contaminated environment, inspection and service, or other operations in an unmanned, harsh outdoor environment such as offshore, desert, Arctic, Antarctic, subsea and space. Present proposals for contact force limiting for industrial robots suffer from a number of drawbacks and disadvantages. There remains a significant need for the unique apparatuses, systems and methods disclosed herein.

SUMMARY

For the purposes of clearly, concisely and exactly describing illustrative embodiments of the present disclosure, the manner and process of making and using the same, and to enable the practice, making and use of the same, reference will now be made to certain exemplary embodiments, including those illustrated in the figures, and specific language will be used to describe the same. It shall nevertheless be understood that no limitation of the scope of the invention is thereby created, and that the invention includes and protects such alterations, modifications, and further applications of the exemplary embodiments as would occur to one skilled in the art.

One exemplary embodiment is a system comprising an operator input device structured to move in response to operator-applied force and to selectably output feedback force to the operator. A first computing system is structured to receive input from the operator input device and provide an output. A second computing system is structured to receive the output and provide a robot control command subject to a force constraint. An industrial robot system is in operative communication with the second computing system and comprises a robotic arm structured to move in response to the command. The second computing system is structured process the output to impose force constraint using a dual threshold hysteresis control. The first computing system is structured to apply a feedback force to the operator input device correlated to force encountered by the industrial robot system. Further embodiments shall be apparent from the following description.

DETAILED DESCRIPTION OF ILLUSTRATIVE EMBODIMENTS

Figure 1:
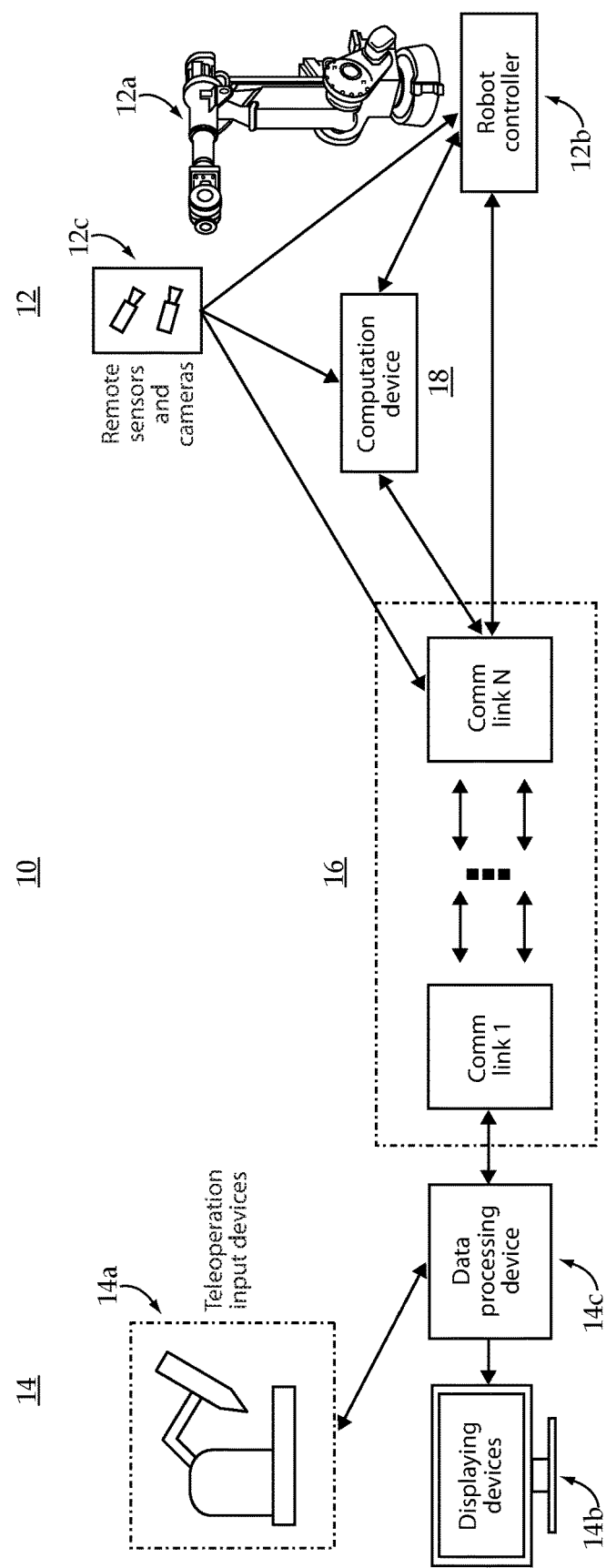
FIG. 1 shows a system that has at least one remote robot station, at least one operator station and at least one communication link between the two stations.

Referring now to FIG. 1, there is shown a tele-operated robot system 10 that has at least one remote robot station 12, at least one operator station 14 and at least one communication link 16 between the robot station 12 and the operator station 14. The physical distance between the remote robot station 12 and the operator station 14 can vary from adjoining one another to a great distance (e.g., on different continents).

Robot station 12 includes at least one robot 12a. Robot 12a is for example a six degree of freedom industrial robot available from ABB. Robot station 12 also includes a robot controller 12b that includes a data interface that accepts motion commands and provides actual motion data, and optionally one or more remote sensor devices 12c, such as cameras, microphones, position sensors, proximity sensors and force sensors, that observe the robot station 12. The sensor devices 12c may either be smart sensors, that is the sensor device 12c includes data processing capability, or not smart sensors, that is, the sensor device 12c does not include data processing capability.

If the sensor devices 12c are smart sensors then the output of the sensor devices is connected directly to robot controller 12b. If the sensor devices 12c are not smart sensors, then their output can be connected either to a computation device 18 to process the sensor device output or to the communication link 16 described in more detail below so that the sensor device output is processed in data processing device 14c.

The robot station 12 can also include as an option one or more actuators and other devices, that are mounted to the robot or next to the robot, such as grippers, fixtures, welding guns, spraying guns, spotlights and conveyors.

The controller 12b has the program which when executed controls the motion of the robot 12a to perform work. The robot may be operatively coupled with a tool which is used to perform work on a stationary or moving workpiece or which may hold the workpiece which has work performed on it by an appropriate tool. The remote sensor devices 12c provide input signals to the controller 12b that the controller uses to control the robot 12a in performance of the work.

The operator station 14 has at least one tele-operation input device 14a such as joysticks or stylus-type devices which the operator uses to create continuous motion signals (position or speed signals). When force feedback is added to these devices they become haptic devices. This feedback causes a vibration in the joystick and the operator feels the force feedback in the stylus-type devices.

The signals from these input devices 14a are used by the controller 12b to operate the robot 12a. The device side also has at least one display device 14b and a data processing device 14c which is connected to both the input devices 14a and the display devices 14b.

The monitoring (display) device 14b shows actual data about the robot motion and attached processes, for example, camera images, acoustic feedback and sensor values. The data processing device 14c processes data in both directions. Device 14c may for example be an industrial PC or a PLC.

The operator station 14 may also include a safety enable device that is separate and distinct from input devices 14a and may for example be a three position switch. The safety enabling device enables and disables power to the robot 12a and attached processes.

The communication link 16 connects the robot controller 12b and the data processing device 14c to each other. The communication link 16 comprises one or more communication links 16-1 to 16-N. The communication link 16 between the operator station 14 and the robot station 12 may be realized with various technologies (e.g. fiber-optic/radio/cable on different types and layers of data protocols). A major portion or the entire infrastructure of the communication link 16 may already exist and be used for other purposes than tele-operating robots. Typical examples are Ethernet installations with LAN and WLAN, Bluetooth, ZigBee and other wireless industrial links, point-to-point radio systems or laser-optical systems, and satellite communication links.

System 10 is operated to maintain a reliable real-time communication link 16 between device side 14 and the remotely located robot side 12. The system 10 changes parameters of the communication link 16 and the robot motion, depending on the current available data rate and/or transmission time of the communication link 16.

In system 10, the operator has direct remote control of the motion of robot 12a and attached processes. Thus the term real-time as used herein is in the context of tele-operation of the motion of a robot 12a or a machine. The tele-operation is considered to be real-time if a maximum delay between operator commands, robot motion and feedback about robot motion and attached processes at the operator station is not exceeded, the maximum delay is dependent on the speed of machine motion (i.e., with slow machine motion a slightly longer delay is acceptable), and the maximum delay is deterministic (i.e., the delay time does not significantly vary over time). This understanding of real-time operation is similar to real-time computation, where not only wrong results of logic and arithmetic operations can occur but also not timely results cause errors.

Exceeding the maximum delay may result in damage to the workpiece or to the robot 12a or other equipment on the robot side. For example, if the tele-operated robot 12a is used in a grinding application and the communication delay exceeds the maximum delay, this causes the operator to remove more material from the workpiece than desired. This excess removal of material can result in damage to the workpiece. Also for example, if the tele-operated robot 12a is used in a material handling application, the communication delay exceeding the maximum delay causes the collision between the robot 12a and other equipment on robot side.

Figure 2:
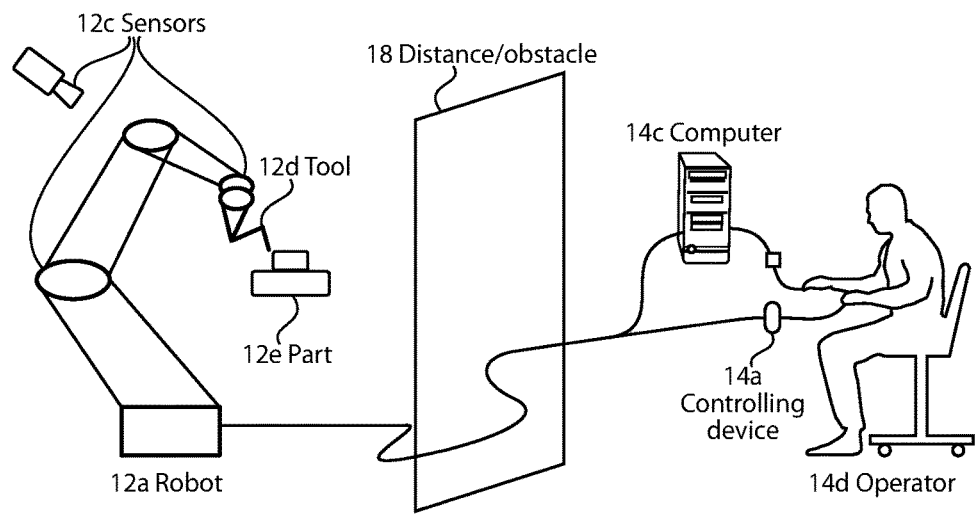
FIG. 2 shows the system of FIG. 1 with added elements.

FIG. 2 illustrates the robot tele-operation system 10 in a manner similar to that shown in FIG. 1 with the added elements described herein. An element in FIG. 2 that is identical to the same element shown in FIG. 1 has the reference numeral used for that element in FIG. 1. For ease of illustration, the display 14b and the data processing device 14c shown in FIG. 1 are not shown in FIG. 2.

System 10 has a robot 12a that resides in a remotely located robot station 12 with a manufacturing tool 12d operatively coupled with robot 12a and sensors 12c that are on and surround the robot 12a. As shown in FIG. 2, the sensors 12c include a vision system that has one or more cameras (only one camera is shown in FIG. 2 for ease of illustration) and a force sensor mounted in the wrist of the robot 12a.

A controlling input device 14a such as a haptic joystick is in the operator station 14. Device 14a is connected with the robot 12a through wire or wireless communication such as communication link 16 of FIG. 1. An operator 14d operates the device 14a and looks either at a monitor 14b (see FIG. 1) to observe the robot 12a from a distance or through a barrier 18 that is between the robot 12a and the controlling input device 14a.

While not shown in FIG. 2, there is a controller such as controller 12b of FIG. 1 that is associated with robot 12a. The controller 12b is a computing device connected to the robot 12a that is programmed to respond to commands from the controlling input device 14a to use the tool 12d to perform a predetermined operation on part 12e.

A haptics enabled tele-operation system may include a force sensor installed at the robot wrist, as shown in FIG. 2, where as described above sensors 12c includes a wrist force sensor. The haptic control loop sends the force measurement from the force sensor to the controlling device 14a.

Figure 3:
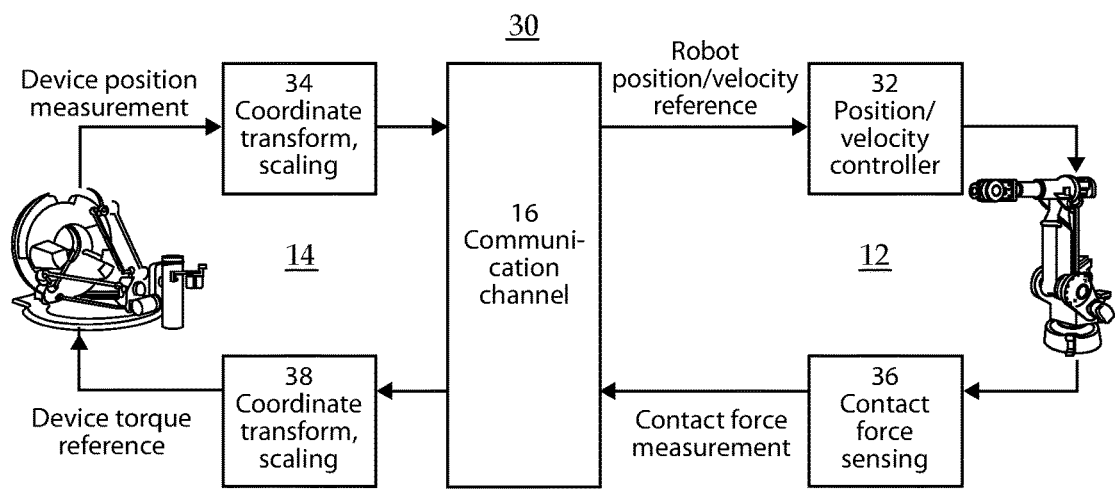
FIG. 3 shows a prior art position/velocity-force haptic control loop for a tele-operated robot.

FIG. 3 shows a prior art position-force or velocity-force haptic control loop 30 for a tele-operated robot. Loop 30 has at the robot station 12 a position or velocity controller 32 which can be either robot controller 12b or computation device 18 of FIG. 1 to control the position and velocity of robot 12a based on a position or velocity reference signal received from the operation station 14 through communications link 16. The robot station 12 provides to operator station 14 using communications link 16 a contact force measurement signal 36 from the force sensor 12c mounted on the robot wrist.

At the operator station 14 there may be provided a coordinate transform and scaling logic block 38 for the received contact force measurement signal 36. Block 38 is structured to utilize a force feedback gain value for scaling received feedback. The force feedback gain value determines how much force the operator will actually feel from the controlling device 14a in response to a given feedback magnitude. Since the haptic force generated by the device 14a is typically much smaller than the actual contact force sensed by the force sensor 12c, the higher the feedback gain, the more realistic the operator 14d will feel about the environment. However a higher force feedback gain may cause the haptic loop to be unstable.

Some controlling devices have very limited force/torque output that a human can easily overcome. A human operator 14d can continue pushing a fully loaded controlling device 14a to the level that causes a large contact force to occur at the remote site between the robot 12a and its environment.

Without a force safe guard, may cause damage to the robot 12a, the tooling 12d, the work piece 12e or other items in the robot environment.

FIG. 3 also shows coordinate transform and scaling logic block 34 between the operator station 14 and the robot station 12. The logic of block 34 determines how the motion of the input device 14a is reflected on the robot side. For example, a scale of 1 means a 1 mm movement of the input device 14a will cause a 1 mm movement on the robot side.

Figure 4:
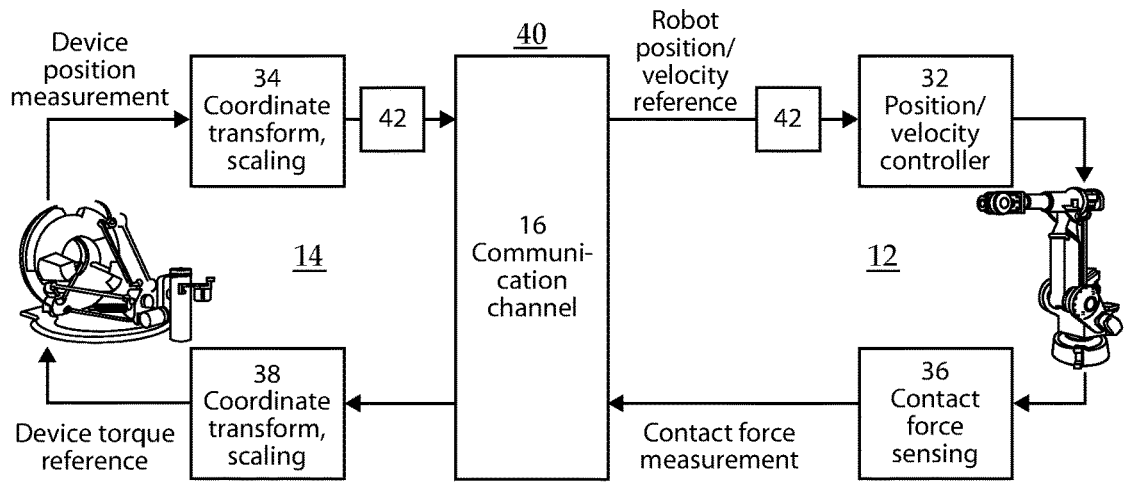
FIG. 4 shows a position/velocity-force bilateral haptic control loop with a force limiting control function for a tele-operated robot.

Referring now to FIG. 4, there is shown for a tele-operated robot an embodiment for a position/velocity-force bilateral control loop 40 with a force limiting control function 42. An element in FIG. 4 that is identical to the same element shown in FIG. 3 has the reference numeral used for that element in FIG. 3.

FIG. 4 illustrates one example of a haptic feedback loop including a real time force limiting control function block 42. Control function block 42 is illustrated as being implemented between boxes 34 and 16, or between boxes 16 and 32. Control function block 42 may be implemented in a computing device associated with or containing block 32, or a computing device associated with or containing block 34. Control function block 42 may be structured to limit the position and/or velocity references utilized in controlling a robot art in order to meet the user preset force limit requirement.

Figure 5:
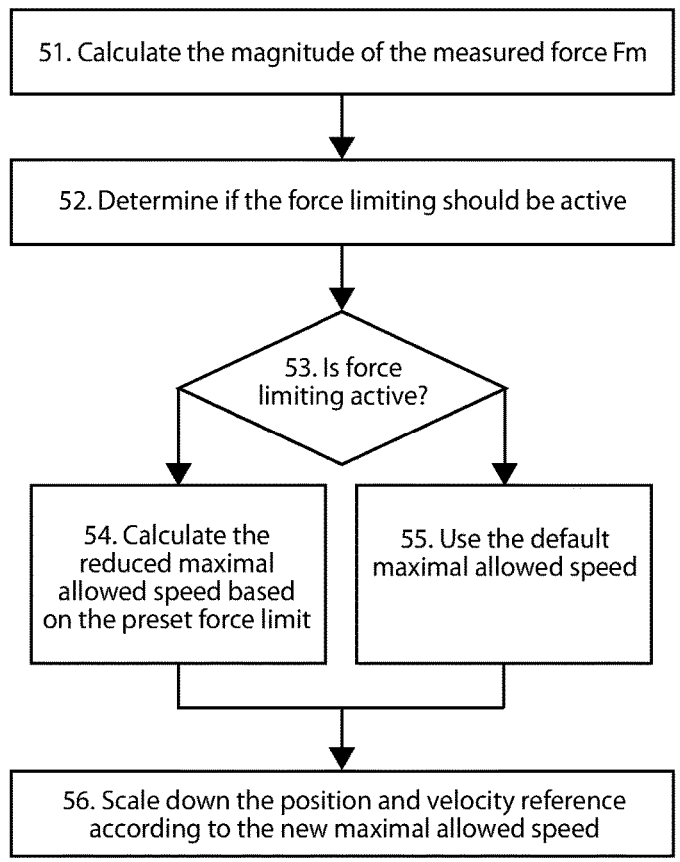
FIG. 5 shows a flowchart for one implementation of a force limiting control function.

FIG. 5 shows the flowchart 50 for one implementation of the force limiting control function block 42. In this implementation, force limiting is accomplished by imposing a velocity limit. A default maximum robot arm velocity established for all modalities of operation of an industrial robot is utilized. When force limiting is active, a reduced maximum robot arm velocity is calculated from a preset force limit and is used to scale down the position and velocity references before they are sent to the robot controller 12b. The force limiting function block 42 does not need to be always active since the measured force magnitude $F_m$ can be much smaller than the preset force limit $F_{lim}$. This is true when the robot 12a is not in contact with any object.

At block 51 of the flowchart, the magnitude of the measured force Fm is calculated. The next step as shown in block 52 is determining when the force limiting control function should be active. An exemplary criterion in for that determination is: if force limiting is not active, and Fm is greater than 80% of $F_{lim}$, then force limiting is set to activated; if force limiting is active, but Fm is smaller than 20% of $F_{lim}$, then force limiting is set to not active; otherwise no changes to the force limiting state. This example for determining if force limiting should be active uses a hysteresis thresholding technique. The hysteresis enables more reliable switching on and off the force limiting function. Measured force is preferably low pass filtered before hysteresis thresholding so noise in the force measurement will not activate or deactivate the force limiting function.

Flowchart 50 then proceeds to conditional 53 which determines whether force limiting is active. If force limiting is active, flowchart 50 proceeds to block 54 which calculates a reduced maximum robot speed based on the preset force limit. If force limiting is not active, flowchart 50 proceeds to block 55 where the default maximal allowed speed is used. The relation between the force limit and the speed limit, needed in block 54, depends on the underlying robot control architecture. FIG. 5 assumes the underlying robot controller 12b is a force controller with speed feedforward input. An example of such a controller is described below with reference to FIG. 7. With this control, the force limit is proportional to the speed limit with a damping constant.

From either block 54 or 55 the flow proceeds to block 56 where the position and velocity reference is scaled down according to the new maximal allowed speed. The force limiting function shown in FIG. 5 limits the contact force between the robot and its environment. Additional controls are utilized to provide intuitive feedback to the operator that the contact force is reaching the limit. For control loop 40 shown in FIG. 4, the operator can continue to push forward the input device 14a of FIG. 2 even though the robot 12a stops moving due to the force limiting function.

Figure 6:
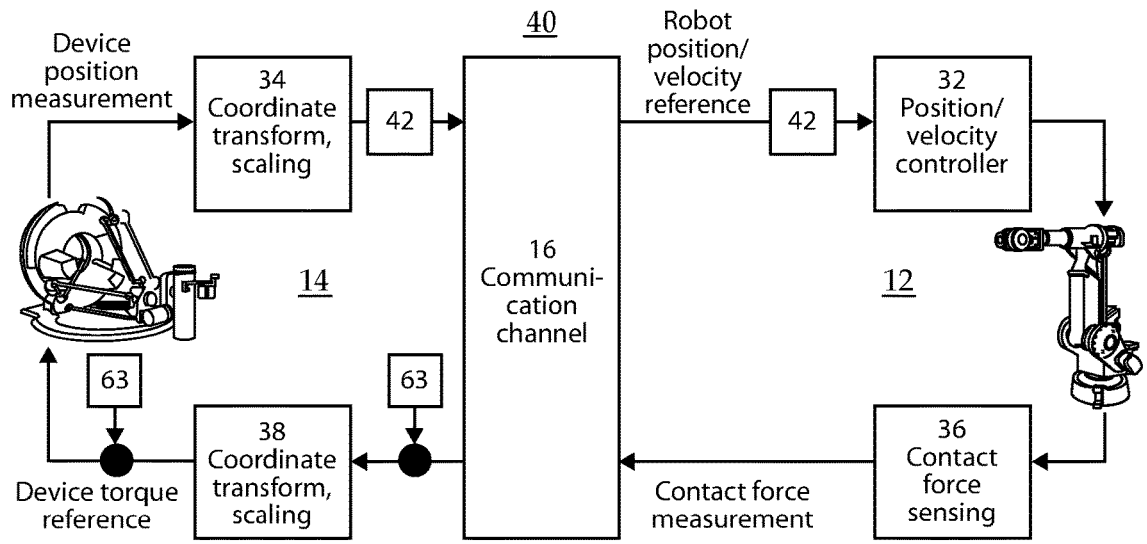
FIG. 6 shows an embodiment for a tele-operated robot a position/velocity-force bilateral haptic control loop with force limiting and virtual constraint force feedback.

FIG. 6 shows an exemplary system structured to provide haptic force feedback to an operator input which is correlated with the contact force associated with a tele-operated robot. FIG. 6 illustrates a force feedback control function block 63 which can be implemented either before or after block 38 and may be part of a computing system associated with or containing block 38. Block 63 may be structured to calculate a virtual constraint force $F_{vc}$ which may indicate that the robot is lagging behind the operator's commanded operation. The virtual constraint force may be utilized in controlling an operator input device to provide haptic feedback force to the operator. There are a number of ways to determine the virtual constraint force and haptic feedback force, several non-limiting example of which shall now be described.

In certain embodiments a virtual spring control technique may be utilized to determine a virtual constraint force. This control technique may be independent from and need not utilize feedback output from a force sensor on the robot, although the techniques may be used in combination as described below. In one example, controls structured to implement the equation $F_{vc}=-K*(P_{desired}-P_{actual})$ may be used to set a virtual spring of constant K between the desired robot position $P_{desired}$ and the actual robot position $P_{actual}$. When an operator continues to push the input device beyond the force limit, $P_{desired}$ will continue to increase while $P_{actual}$ stays unchanged. As a result, $F_{vc}$ will be increased accordingly. Due to the negative sign of the virtual spring constant, this virtual force gives the operator resistance feedback correlated with the force that would be experienced by robot arm if responding to the operator command. This force may increase so as to eventually stop the input device from moving further.

In certain embodiments a dampened differential velocity control technique may be utilized to determine the virtual constraint force. This technique may be independent from and need not utilize feedback output from a force sensor on the robot, although the techniques may be used in combination as described below. Controls structured to implement the equation $F_{vc}=-D*(V_{desired}-V_{actual})$ may be used to set a virtual damper of constant D between the desired robot speed feedforward $V_{desired}$ and the actual robot speed feedforward $V_{actual}$. This difference of the speed feedforward may be the speed reduction shown in block 54 of flowchart FIG. 5. In certain embodiments a combined virtual spring and dampened differential velocity control technique may be utilized to determine the virtual constraint force. For example, a virtual constraint force used to provide haptic feedback force can be calculated by controls implementing the equation $F_{vc}=-K*(P_{desired}-P_{actual})+-D*(V_{desired}-V_{actual})$.

Certain embodiments may utilize feedback output from a force sensor on the robot to determine the virtual constraint force. For example, a force sensor output value may be scaled (e.g., scaled down linearly from the robot scale to the operator input device scale) and the scaled value may be utilized as the virtual constraint force. The scaled value may also be processed through a low pass filter to mitigate undesired control behavior. A proportional haptic force may be provided by the scaled value of the actual contact force and may vary linearly with the feedback force from one or more robot force sensors. In one example, a scaled filtered feedback force used to provide haptic feedback force may be determined by controls structured to implement the equation: $F_{scaled\_filtered\_feedback} = LPF\ (SF*F_{robot\_sensor})$ where $F_{scaled\_filtered\_feedback}$ is the scaled filtered feedback force, LPF is a low pass filter function, SF is a scaling factor, and $F_{robot\_sensor}$ is feedback force from a robot sensor.

Certain embodiments may utilize feedback output from a force sensor on the robot in combination with a virtual spring control technique and/or a dampened differential velocity control technique to determine the virtual constraint force. In certain embodiments, the haptic feedback force may be determined by combining a virtual constraint force and a scaled force sensor output value. For example, a virtual constraint force used to provide haptic feedback force can be calculated by controls structured to implement the equation: $F_{haptic\_feedback} = F_{vc} + F_{scaled\_filtered\_feedback}$. In a further example, a virtual constraint force used to provide haptic feedback force can be calculated by controls implementing the following logic: if $F_{robot\_sensor} < F_{threshold}$ then $F_{haptic\_feedback} = F_{vc}$, else $F_{haptic\_feedback} = F_{saturated}$, where $F_{robot\_sensor}$ is a feedback force from one or more robot sensors, $F_{threshold}$ is a threshold that may be correlated with the activation of a force limit on the robot such as the force limits described above in connection with block 43, $F_{haptic\_feedback}$ is the haptic feedback force provided by the operator input device, $F_{vc}$ may be any of the formulations for the virtual constraint force set forth above, and $F_{saturated}$ is a force limit that will saturate the contact force and resulting haptic feedback force indicating to the operator that a hard limit on robot operation has been reached. Depending on the actual implementation of the force limiting function and the haptic effect, when force limiting is active, the haptic force may be not be proportional to the actual force or may be proportional only over a certain feedback force range. For example, haptic feedback force may vary proportionally with feedback force it is desirable to add additional virtual constraint force to the haptic effects to give the user a much stronger resistance.

In certain applications, force limiting in combination with a virtual constraint force providing haptic feedback to the operator provides may provide improved operator transparency and stability relative to using a simple linear/nonlinear force scaling factor. Force limiting reduces the peak impact force when it works together with a not shown low pass filter for haptic feedback. This allows the use of a larger feedback gain.

The blocks and operations of the system of FIG. 6 may be implemented using a number of different computing system arrangements and configurations. For example, in certain embodiments a first computing system may be structured to receive input from an operator control device indicating position or movement of the operator input device, process the received input, and provide a resulting output to a communication link. A second computing system in operative communication with a industrial robot system may be structured to receive the output from the communication link, process the output to provide a robot control command subject to a force constraint, and output the command. The industrial robot system may include and a robotic arm structured to move in response to the command, a tool operatively coupled with the robotic arm, and a feedback device structured to provide feedback to the second computing system from which force encountered by the tool may be determined. The second computing system may be structured process the output to impose force constraint using a dual threshold hysteresis control structured to activate a force limit if the output exceeds a first threshold and to deactivate the force limit if the output is below a second threshold, the second threshold being below the first threshold, and the first computing system is structured to receive the feedback from second computing system via the communication system, process the feedback to compute a feedback force, and output a feedback force command effective to cause the input device to apply the feedback force to the operator.

It shall be appreciated that the first computing system and the second computing system in the foregoing embodiments may be provided in a number of different physical forms. In certain forms the first computing system and the second computing system may comprises physically distinct computing devices in communication with one another. In certain forms the first computing system and the second computing system may comprise partially physically distinct computing devices which share in common one or more devices or resources. In certain embodiments the first computing system and the second computing system may be comprise a single physical computing device which may be structured to provide the first computing system and the second computing system using distinct devices and resources, devices and resources shared in common, or combinations thereof.

Figure 7:
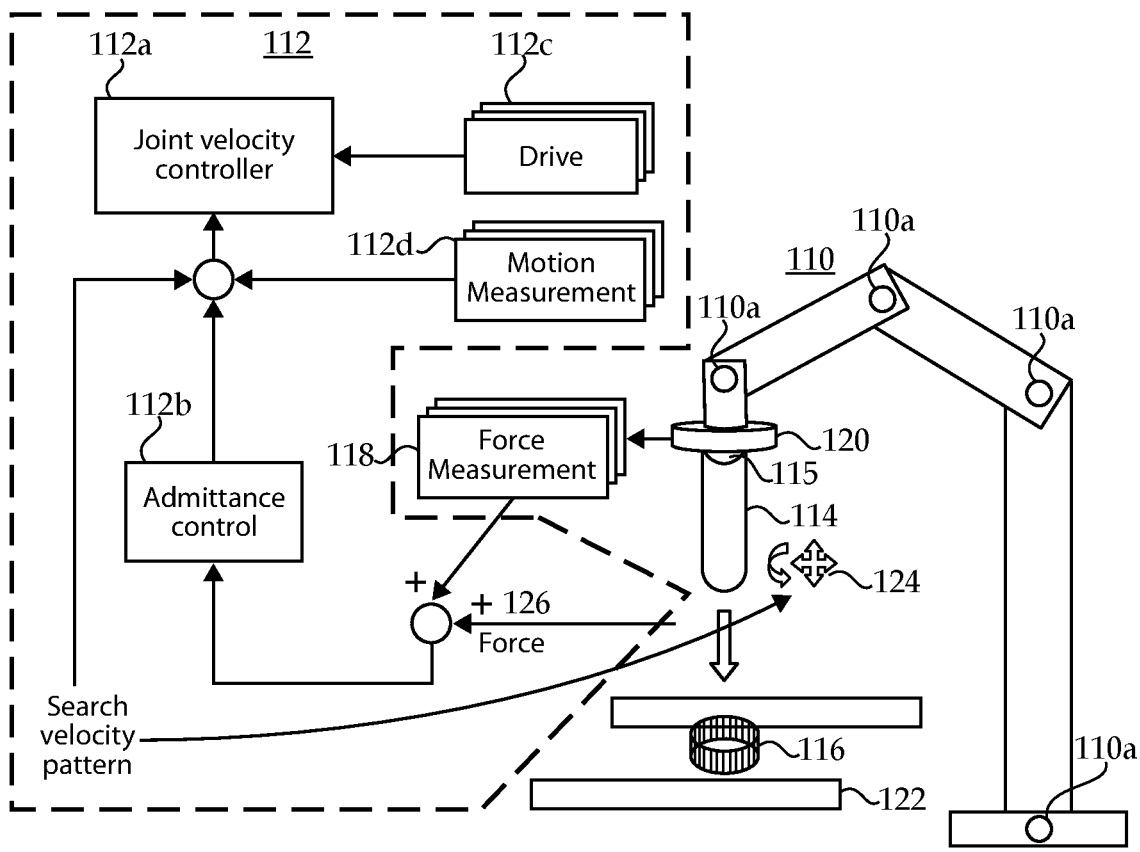
FIG. 7 shows an articulated industrial robot interfaced with a computer controller that can be utilized in connection with the embodiments shown in FIGS. 4 and 6.

FIG. 7 shows an articulated industrial robot 110 interfaced with a computer controller 112 wherein the method described herein is implemented. Computer controller 112 comprises joint velocity controller 112a, admittance control 112b and for each articulated joint 110a of robot 110 a mechanical actuation device or drive 112c and a motion measurement 112d. Controller 112 also includes a processor which is not shown in the illustrated schematic.

In an exemplary industrial robots, there are four to seven articulated joints and when controlled synchronously, the end-effector 115 of the robot 110 can move in a three dimensional task space and follow a pre-designed trajectory. As described above, each joint would have its own mechanical actuation device or drive 112c, typically a servomotor, and measurement device 112d, typically a resolver or encoder to measure the joint angle. The admittance function provided by controller 112b is defined as the velocity of the robot end-effector 115 in response to the environmental forces applied to the end-effector 115 and is used to analyze and synthesize the force feedback control to achieve stability and agility. Thus the admittance function defines the dynamics of how the reference speed input to the joint velocity controller 112a is affected by the measured force changes.

In exemplary industrial robots, the computer controller takes the inputs from each joint position measurement, and drives the servomotor so that the end-effector can be accurately positioned in the task space. This apparatus and its control method are sufficient for tasks where work object position is known to the robot controller and contact between the robot and work object is minimal, for example, in painting and arc welding applications.

For a simple application shown in FIG. 7, where a peg 114, held by the robot 110, has to be inserted in the hole 116, of which its location and orientation are not precisely known to the robot controller 112, jamming, galling and unrealistically long completion time are among the very common problems for a conventional robot to perform this task.

Introducing a measurement of contact force to the robot controller 112 is a first step to address the problem. However, doing such fundamentally changes the industrial robot in the several respects. First, the contact dynamics has to be addressed adequately in the feedback control loop so that desired contact behavior (e.g., stable and gentle) can be achieved. Stable and gentle contact behavior is largely ignored and treated as disturbance in the conventional position controlled robot. Further the interaction force between the parts to be mated cannot exceed a maximum value since exceeding that value raises the risk that the product to be assembled by the robot will have a shorter life time, a lower performance or may break when it is used. Second, a guaranteed gentle contact only would not lead to successful assembly. Rather it is how the robot 110 is commanded to react to a difficult contact situation, e.g., a splined shaft insertion in an automotive transmission assembly that dictates how fast the task can be performed. As pointed out before, the conventional robot positional programming concept is difficult to be adapted into these applications.

To this end, the embodiment shown in FIG. 7 may be structured as follows. Taking the input, represented in FIG. 7 by force measurement 118, from a six-axis force/torque sensor 120 mounted on the robot wrist, an attraction force vector 126 generated by the not shown processor in the computer controller 112 is superimposed on the measured force in a preferred direction or orientation. The attraction force vector 126 is specified in the program which is executed by the processor. It should be appreciated that the force vector 126 may also be a repulsive force vector as the same may be needed during the assembly of the mating parts and the force provided by the vector whether it is that of attraction or repulsion need not be constant.

The attraction force vector 126 is imposed on the robot so that the robot end-effector 115, where one of the mating parts such as for example peg 114 is mounted, is always subject to a force which may be constant, that is, the absolute value of the vector. When no contact is established by the end-effector 115 with the plate 122 where the other of the mating parts such as for example hole 116 is located, this attraction force will always drag the end-effector 115 toward that location until a proper contact is established.

Using the example of the peg-in-a-hole assembly as shown in FIG. 7, if the plate 122 is placed under the robot end-effector 115, with the location of the hole 116 not known, and a downward attraction force (e.g. 60 N) is imposed, this downward force would tend to drag the peg 114 down towards the plate 122 before the 60 N contact force is achieved. In this case, no positional command has to be sent to the robot controller 112. In other words, the robot controller 112 does not have to know if the plate 122 is 100 mm or 200 mm away from the tip of the peg 114. The other use of the attraction force vector will be illustrated later in the description.

Once the contact with the plate 122 is established, the contact behavior are mainly addressed in the admittance control block 112b, where the force/torque value are converted into a velocity command value and parameters are designed for stable and gentle contact. As is shown in FIG. 7, the input to admittance control block 112b is the sum of the output of force measurement 18 and the attraction force vector 126. The output of admittance control block 112b is one input to joint velocity controller 112a which adjusts drive 112c so that the contact force of peg 114 with plate 122 is minimized. The admittance control block 112b is preferably utilized in combination with the attraction force vector 126.

Suppose the tip of the peg 114 is now in contact with the top surface of the plate 122, but the location of the hole 116 is unknown to the robot controller 112. As is shown in FIG. 7, a search velocity pattern 124 in a plane parallel to the plate surface is superimposed by the processor in controller 112 on the velocity command 128 from the admittance control block 112b. An example of the search pattern in this case might be a circular motion or a spiral motion in a plane parallel to the plate surface to cover the possible location of hole 116. As long as the uncertainty of the location of hole 116 is within the possible range of the search pattern, eventually the peg 114 will have a perfect fit with the hole 116, at which time, the attraction force would automatically drag the robot downward again for the peg to be inserted into the hole 116. As can be appreciated the search range should be selected to cover the maximum possible uncertainty in the location of the hole 116 on plate 122. Again, the robot controller 112 does not have to provide a positional command to drive the robot 110 to go downward. While in the embodiment described herein the search velocity pattern 124 is in a plane parallel to the plate surface it should be appreciated that in other applications the pattern may be in at least two directions and orientations that makes mating of the work pieces possible. During the entire process, the robot computer controller 112 only has to provide the: 1) designed application appropriate attraction or repulsion force; 2) proper search pattern to encompass parts uncertainty; and 3) criteria to know when the task is completed.

While illustrative embodiments of the disclosure have been illustrated and described in detail in the drawings and foregoing description, the same is to be considered as illustrative and not restrictive in character, it being understood that only certain exemplary embodiments have been shown and described and that all changes and modifications that come within the spirit of the claimed inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

The invention claimed is:

1. A system comprising:
an operator input device structured to move in response to operator-applied force and to selectably output feedback force to the operator;
a first computing system structured to receive input from the operator input device indicating position or movement of the operator input device, process the received input, and provide a resulting output to a communication link;
a second computing system structured to receive the output from the communication link, process the output to provide a robot control command subject to a force constraint, and output the command; and an industrial robot system in operative communication with the second computing system, the industrial robot system comprising a robotic arm structured to move in response to the command, a tool operatively coupled with the robotic arm, and feedback device structured to provide feedback to the second computing system from which force encountered by the tool may be determined;

wherein the second computing system is structured to process the output to impose force constraint using a dual threshold hysteresis control structured to activate a force limit if the output exceeds a first threshold and to deactivate the force limit if the output is below a second threshold, the second threshold being below the first threshold, and the first computing system is structured to receive the feedback from the second computing system via the communication link, process the feedback to compute a feedback force, and output a feedback force command effective to cause the input device to apply the feedback force to the operator.

2. The system of claim 1 wherein the force constraint is implemented as a limit on speed.

3. The system of claim 1 wherein the feedback force is calculated as a value equal to the difference between a commanded position of the tool and an actual position of the tool multiplied by a constant.

4. The system of claim 3 wherein the first computing device is structured to perform one or both of coordinate transformation and scaling on the calculated feedback force.

5. The system of claim 1 wherein the feedback force is calculated as a value equal to the difference between a commanded velocity of the tool and an actual velocity of the tool multiplied by a constant.

6. The system of claim 5 wherein the first computing device is structured to perform one or both of coordinate transformation and scaling on the feedback information utilized as input to calculate the feedback force.

7. The system of claim 1 wherein the first computing system is structured to process the received input by performing one or both of a coordinate transformation and a scaling operation.

8. The system of claim 1 wherein the feedback force is calculated based upon a force measurement provided as the feedback from the industrial robot system to the second computing system.

9. A method of operating an industrial robotic system including a robotic arm and a tool operatively coupled to the robotic arm, the method comprising:

operating an operator input device structured to move in response to operator-applied force and to selectably output feedback force to the operator;

receiving, with a first computing system, input from the operator input control device indicating position or movement of the operator input device;

processing the received input with the first computing system;

transmitting an output from processing the received input to a second computing system;

processing, with the second computing system, the output to generate a robot control command subject to a force constraint, the force constraint being imposed using a dual threshold hysteresis control structured to activate a force limit if the output exceeds a first threshold and to deactivate the force limit if the output is below a second threshold, the second threshold being below the first threshold;

transmitting the robot control command to the industrial robotic system;

operating the industrial robotic system using the robot control command;

receiving, with the first computing system, feedback from the industrial robotic system indicating force encountered by the tool;

processing, with the first computing system, the feedback to compute a feedback force;

outputting, with the second computing system, a feedback force command to the operator input device; and applying the feedback force to the operator in response to the feedback force command.

10. The method of claim 9 wherein the feedback force is haptic feedback.

11. The method of claim 10 wherein a magnitude of the haptic feedback is proportional to a magnitude of the feedback from the industrial robotic system subject to a force limit which indicates to the operator that a hard limit on robotic operation has been reached.

12. The method of claim 9 wherein the feedback force is calculated as a value equal to the difference between a commanded velocity of the tool and an actual velocity of the tool multiplied by a constant.

13. The method of claim 9 wherein processing the received input includes performing one or both of a coordinate transformation and a scaling operation.

14. The method of claim 9 comprising measuring the feedback using a plurality of sensors including at least two of a position sensor, a proximity sensors, a camera, a microphone and a force sensor.

15. A control system for a remote industrial robot system including a robotic arm structured to move in response to a robot control command, a tool operatively coupled with the robotic arm, and feedback device structured to provide feedback from which force encountered by the tool may be determined, the control system comprising:

an operator input device structured to move in response to operator-applied force and to selectably output feedback force to the operator; and a computing system structured to
 receive input from the operator input device indicating position or movement of the operator input device,
 process the received input to provide the robot control command subject to a force constraint, the force constraint being imposed using a dual threshold hysteresis control structured to activate a force limit if the output exceeds a first threshold and to deactivate the force limit if the output is below a second threshold, the second threshold being below the first threshold,
 output the command to the industrial robot system,
 receive the feedback from the feedback device,
 calculate a feedback force using the feedback, and
 output a feedback force command effective to cause the input device to apply the feedback force to the operator, wherein the computing system comprises a local computing system in communication with the operator input device and a remote computing system in communication with the industrial robot system, and wherein the local computing system is in communication with the remote computing system by way of a communication link.

16. The system of claim 15 wherein the force constraint is implemented as a limit on velocity.

17. The system of claim 1 wherein the feedback force is calculated as a value equal to the difference between a commanded position or velocity of the tool and an actual position or velocity of the tool multiplied by a constant, and wherein the local first computing device is structured to perform one or both of coordinate transformation and scaling on the calculated feedback force.

18. The computing device of claim 15 wherein the feedback device is a six-axis force/torque sensor.

19. The system of claim 15 further comprising a safety enable device structured to allow remote enabling and disabling of the power to the industrial robot system.

20. The method of claim 10 wherein the operator input device is a haptic device and the operator input device is structured to provide a vibration as the feedback force.

\* \* \* \* \*